United States Patent [19]

Moorhouse

[11] Patent Number: 4,993,819
[45] Date of Patent: Feb. 19, 1991

[54] EXTERNAL GUNSIGHT EYEPIECE ATTACHMENT

[75] Inventor: Ralph E. Moorhouse, Melbourne Village, Fla.

[73] Assignee: DBA Systems, Inc., Melbourne, Fla.

[21] Appl. No.: 446,850

[22] Filed: Dec. 6, 1989

[51] Int. Cl.$^5$ .................................................. G02B 23/02
[52] U.S. Cl. .................................... 350/557; 350/502; 434/20
[58] Field of Search ........................... 89/41.05, 41.09; 346/38; 350/502, 537, 557; 358/108; 434/16, 19, 20

[56] References Cited

U.S. PATENT DOCUMENTS

| | | | |
|---|---|---|---|
| 2,696,052 | 12/1954 | Czarhikow | 33/46 |
| 2,872,840 | 2/1959 | Stanton | 88/1 |
| 2,937,559 | 5/1960 | Shute et al. | 88/1 |
| 3,227,035 | 1/1966 | Maillard | 88/2.2 |
| 3,352,196 | 11/1967 | Hammond | 88/2.4 |
| 3,453,385 | 7/1969 | Capellaro | 178/6.8 |
| 3,498,725 | 3/1970 | Burrows et al. | 356/251 |
| 3,514,184 | 5/1970 | Vogl | 350/173 |
| 3,522,667 | 8/1970 | Goillenschmidt et al. | 35/25 |
| 3,588,250 | 6/1971 | Arene et al. | 356/8 |
| 3,671,100 | 6/1972 | Bushman et al. | 350/19 |
| 3,798,796 | 3/1974 | Stauff et al. | 358/108 |
| 3,997,762 | 12/1976 | Ritchie et al. | 235/61.5 R |
| 4,534,735 | 8/1985 | Sllard et al. | 434/20 |
| 4,592,659 | 6/1986 | Girault et al. | 356/247 |
| 4,743,765 | 5/1988 | Ekstrand | 250/467.1 |
| 4,755,664 | 7/1988 | Holmes | 250/213 VT |
| 4,758,076 | 7/1988 | Loy et al. | 350/538 |
| 4,764,011 | 8/1988 | Goldstein | 356/251 |

FOREIGN PATENT DOCUMENTS 2141810 1/1985 United Kingdom .................. 434/20

OTHER PUBLICATIONS

General Electric, "Vulcan Air Defense Field Training System", Sep. 1969, four page brochure.

Primary Examiner—Stephen C. Bentley
Attorney, Agent, or Firm—Pollock, Vande Sande & Priddy

[57] ABSTRACT

In an external gunsight viewing apparatus, a housing is provided having a first port coupled to the eyepiece of a gunner's optical sight. A prism is disposed along a common axis between the gunner's eyepiece and a viewing port. The prism folds the image path to an Erfle lens which produces an internal image. The internal image is viewable through a beam combining means, along with a second projected image, folded via a mirror, into the image combining means. A second relay means and additional mirror means direct the combined image along a relay means where they are located along the common axis between the eyepiece and first viewing port.

10 Claims, 3 Drawing Sheets

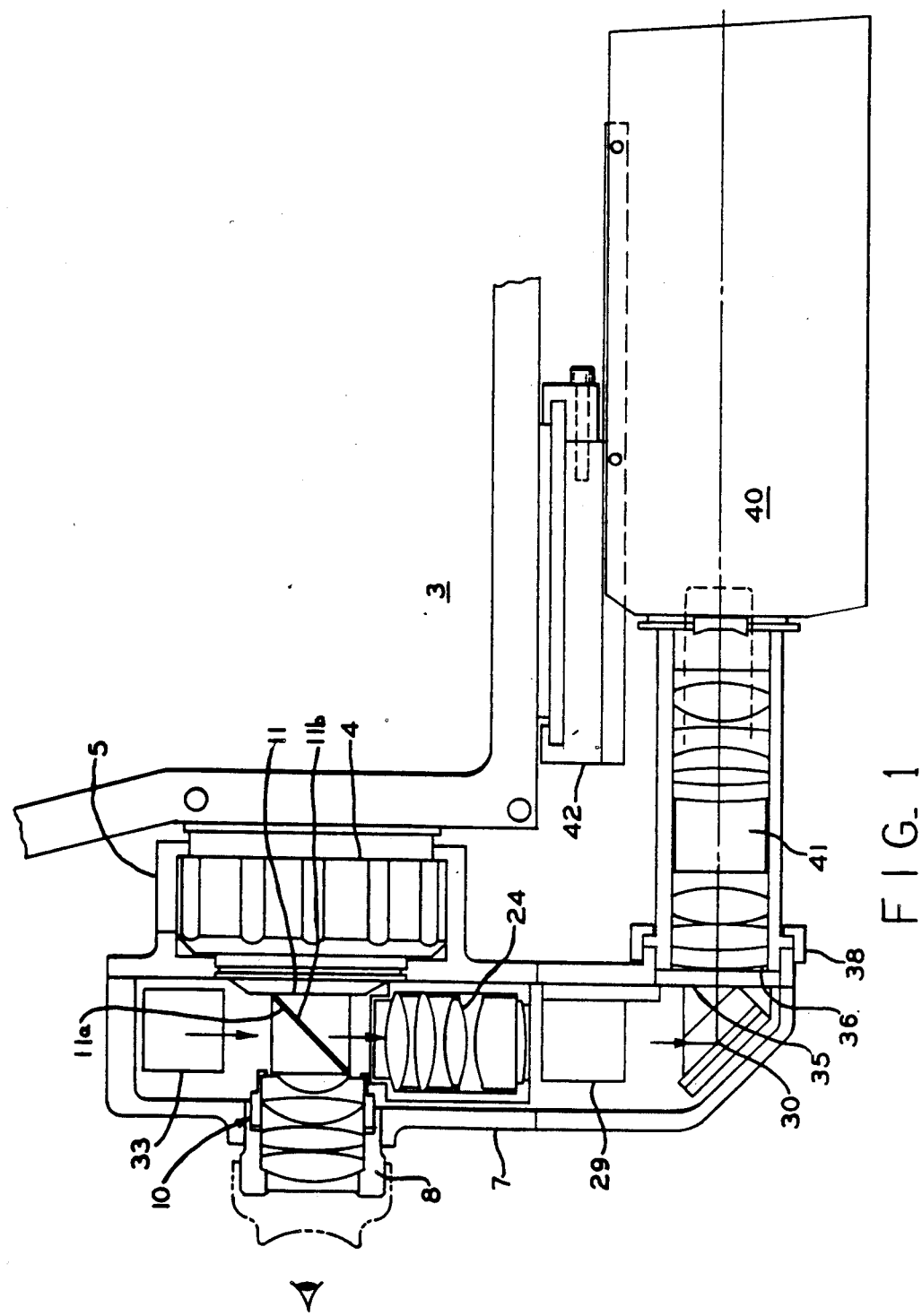

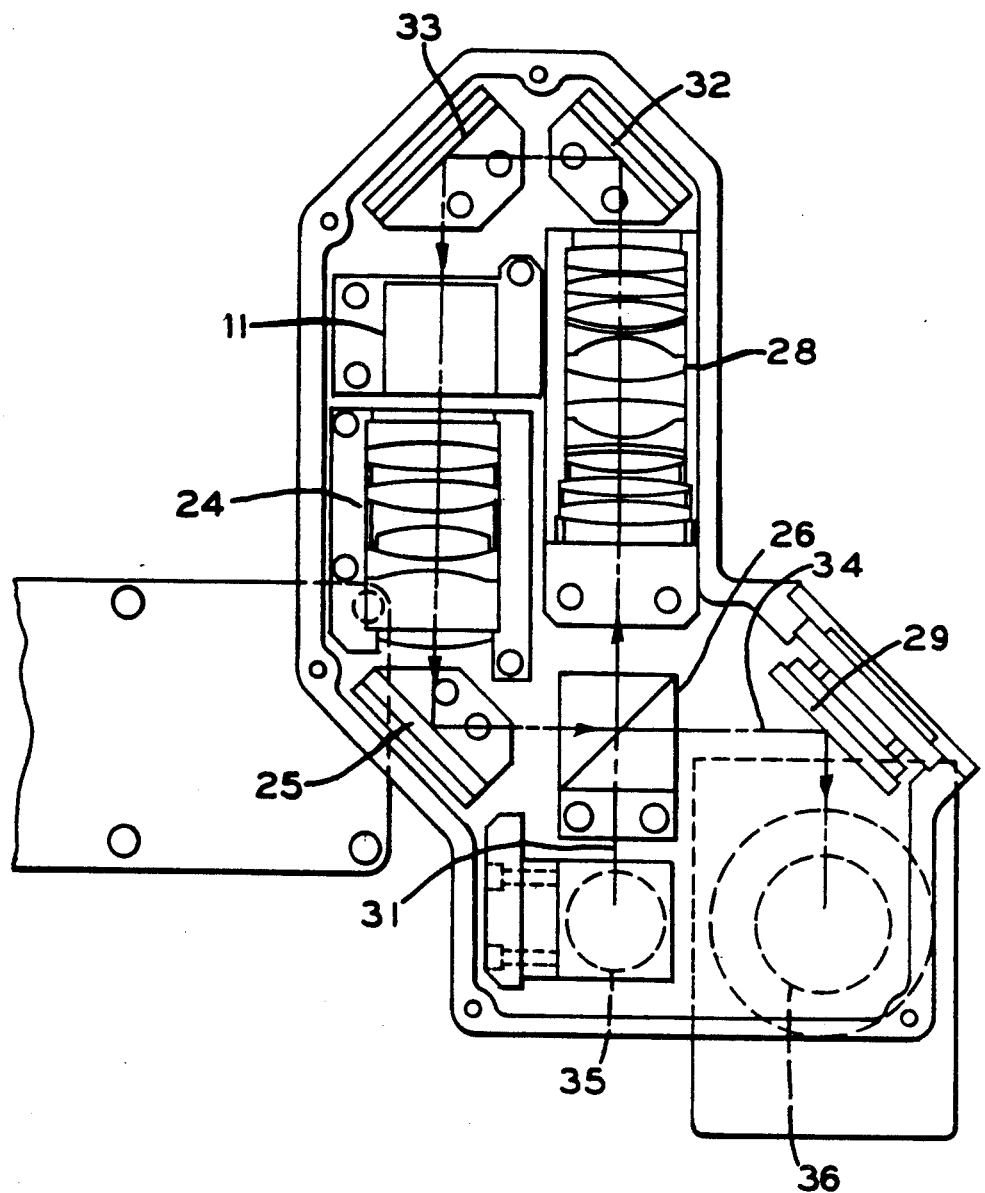
FIG_2

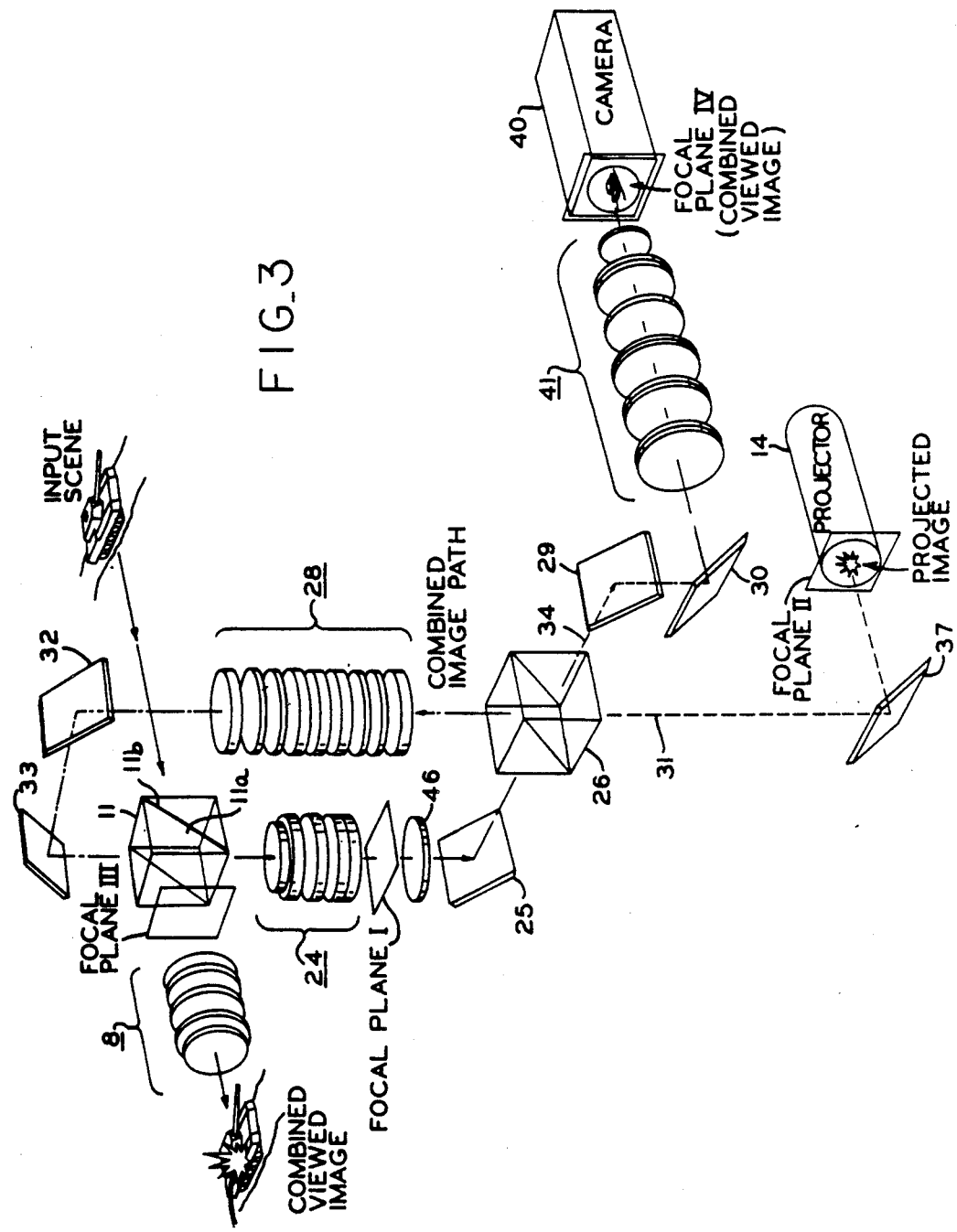

EXTERNAL GUNSIGHT EYEPIECE ATTACHMENT

The present invention relates to optical gunsight viewing devices. Specifically, an external eyepiece attachment is provided for permitting simultaneous viewing of a gunsight input scene as well as a scene applied through an additional optical port.

Modern infantry weapons, such as employed in armored vehicles, provide an optical gunsight for pointing the weapon at the target. As has been found in the past, training of personnel for operating such vehicles often requires that an instructor observe the aiming of the device through the gunsight to assess the performance of a trainee operating the gun. U.S. Pat. No. 3,522,667 describes a simulator which permits viewing by both an instructor and an actual weapons-firing operator through a common optical gunsight.

Various patents have been provided in the past to permit viewing a scene through a gunsight, while superimposing another image onto the viewed scene. Such a device is shown in U.S. Pat. No. 2,937,559.

Providing multiple optical ports for either superimposing an image over a viewed target image, or viewing the target image by camera means or, in other cases, directly viewing the target, requires an attachment to the optical gunsight which will not interfere with normal crew functions/operations nor reduce or change the normal eye relief provided by the unappended gunsight eyepiece. The image field of view which is usually approximately 60° should not be obstructed or reduced by any subsequent attachment to the optical gunsight.

When used in the environment of an armored vehicle such as a tank the available headroom within the vehicle is limited. Any device coupled to the optical gunsight must therefore occupy only a minimum and non-interfering, uncritical amount of space to prevent injury of the operator during training exercises. An eye relief of 24–35 mm. is usually provided to accommodate recoil from the weapon so that vehicle shock or vibration during operation does not strike the firing personnel. The training device must be strap-on removable to enable readying of the vehicle for combat use when the training exercises are complete. No modifications to the existing gunners' eyepiece are permitted.

It is this environment in which the present external gunsight viewing device is implemented. Utilizing the device, a minimal amount of space rearward of the optical sight is utilized so as to preserve the gunsight eyepiece optical characteristics, especially eye relief, with only a minor loss of headroom within the vehicle. Image quality is preserved, with only a negligible amount of distortion introduced by the additional optical elements.

SUMMARY OF THE INVENTION

It is an object of this invention to provide an apparatus which couples to an eyepiece of an optical gunsight and provides multiple simultaneous optical viewing ports.

It is another object of this invention to permit superimposition of a projected image over an image viewed through an optical gunsight.

It is yet another object of this invention to provide an optical port for composite viewing of both superimposed and directly viewed gunsight images.

These and other objects are accomplished in accordance with the invention. In carrying out the invention, a housing is provided which has an optical port which may be directly coupled to an eyepiece of a gunsight. The housing includes at least two other ports for directly viewing an image from the gunsight eyepiece, or superimposing another image over the one viewed through the gunsight.

In carrying out the invention, a first prism is disposed along a common axis between the first and second optical ports, the first of which is coupled to the gunsight eyepiece. The prism, which includes a reflective surface, will fold the optical axis of the input target scene along an orthogonal axis. An Erfle lens used in a reversed mode removes any correction and distortion imparted by the gunsight eyepiece inorder to dulicate the image viewed by the gunsight eyepiece. The internal image thus produced may be viewed through a third port by means of a folding mirror which faces the third port.

A second prism, located in the optical path provided by the folding mirror, permits viewing of the internal image through a relay lens along an optical axis perpendicular to the axis of the third port. The image produced by the relay lens is transmitted by additional folding mirrors to the opposite side of the reflecting surface of the first prism. A second eyepiece in the second port permits direct viewing of the target image reflected from the prism. An even number of optical axis folds is provided so that the image viewed through the second port is both non-inverted and non-reverted, thus being substantially the same image viewed through the gunsight eyepiece.

The invention permits combining a projected image through a fourth port with the relayed internal image so as to produce a combined image simultaneously viewed by both the second and third ports for gunner training enhancement.

DESCRIPTION OF THE FIGURES

FIG. 1 illustrates a section view of a device in accordance with the preferred embodiment of the invention mounted to an optical gunsight.

FIG. 2 illustrates another view of the optical viewing apparatus in accordance with the preferred embodiment with a side cover removed.

FIG. 3 is a schematic drawing showing the optical path and elements located along the optical path for relaying the gunsight image to various ports in the device.

DESCRIPTION OF THE PREFERRED EMBODIMENT

Referring to FIGS. 1 and 2, there is shown the optical viewing device coupled to the eyepiece 4 of an optical gunsight 3. The viewing device includes a first aperture having a clamp 5 for clamping the aperture into facing relationship with the eyepiece 4. Once coupled, the axis of the image produced by the gunner's eyepiece 4 is folded through the viewing device optical system to a first eyepiece 8, connected to a second port of the housing 7 of the viewing device. The eyepiece 8 also includes a diopter control, held by a retainer 10 in the housing 7. The eyepiece is thus adjustable through the diopter control 8, to provide an image to the gunner.

The image viewed through the eyepiece 8 has the same eye relief as experienced by directly viewing the gunner's eyepiece 4.

The image through eyepiece 8 is provided by light reflected from the opaque bonding surface 11a of two prisms 11 in eyepiece 8. The image axis from the gunner's eyepiece 4 is optically folded by an opposite surface 11b, through an Erfle lens assembly 24 and mirror 25. FIG. 2 illustrates additional optical elements including a beam splitter/combiner 26 comprising two additional prisms, relay lens assembly 28, mirror 32 and mirror 33, which fold the optical axis of the image four times so that bonding reflective surface 11b of the prism pair 11 directs the image along the axis of the eyepiece 8.

The beam splitter/combiner 26 provides second and third optical paths 31, 34. Optical path 34 permits viewing of the internal image through a third port 36, which in FIG. 1 includes a camera 40 optically coupled to port 36. The camera 40 has a lens assembly 41 coupled through a nut coupling 38 to optical port 36. The camera 40 is supported to the gunsight 3 by bracket 42.

Mirrors 29 and 30 fold the optical axis 34 into alignment with the axis of lens assembly 41. Thus, the internal image produced by the gunsight 3 is viewed by the camera 40 which may be a cine camera or a camera head of a closed circuit television system.

The optical path 31 permits the superposition of a CRT generated image on the internal image of the target. Through an additional mirror 37, the optical path 31 may be folded along an axis parallel to the axis of camera 40.

It can be seen from FIG. 1 that the lateral profile of the device is narrow, thus conserving space within a vehicle in which the gunner's eyepiece 4 and optical sight 3 are located. The narrow profile also permits retention of the original eye relief without burdening the available space within the fire control room. Suitable seals at the various coupling ports maintain the viewing device sealed against light other than from the optical sight 3.

The various optical path folds encountered by the image before being viewed through optical eyepiece 8 can be analyzed more clearly with respect to FIG. 3.

In FIG. 3 there is shown the first element 11 which is a reflecting prism for folding the optical image path from the gunsight eyepiece 4 along an orthogonal axis to the gunsight axis. The prism 11 comprises back to back opaque mirrors and provides a reduction in the optical path length over a plane mirror, thus increasing the ability to package the device in a smaller housing. The two prisms 11, having along surface 11a and 11b back to back opaque mirrors, direct the input image axis to a five-element Erfle reversing lens 24. The five-element reversing lens 24 provides a reversion of the image from the eyepiece back to an internal image located at focal plane 1. The internal image so located is identical to the one viewed by the gunner's eyepiece 4. The Erfle lens 24 removes optical distortion which the gunner's eyepiece added to the viewed scene, restoring the image at focal plane FI. Field flattener 46 is shown for flattening the restored image reducing any optical aberration of the image in the focal plane.

The mirror 25 bends the optical axis a second 90° where it coincides with an axis of a beam combiner 26. The beam combiner 26 permits viewing of the internal image by the high correction double gauss relay lens assembly 28, as well as viewing an image on the face of the projector 14. The focal length for the double gauss relay lens 28 is equal to the distance along the optical path of the beam combiner 26, mirror 25 to the focal plane FI of the internal image. The image on the CRT face 14 FII is also at the the focal plane FII of the high correction double gauss relay lens assembly 28, along the optical path through the beam combiner 26, mirror 37 to the face of the CRT 14. Thus, the relay lens assembly 28 through the beam combiner 26 views the two image planes as being spatially coincident, both being at the focal plane of the relay lens assembly 28, relaying the coincident images to a mirror 32. The relay lens assembly 28 has a focal plane, measured along the folded optical path including mirrors 32,33, double prism 11, at focal plane III.

Mirrors 32 and 33 provide a folded optical path to the opaque mirrored bonding surface 11a, 11b of the two prisms 11. A focal plane III of the combined images from the input gunsight scene and the CRT 14 produced scene plane is located between the prism 11 and the five-element eyepiece 8. The combined images located on the third focal plane FIII are viewed with a five-element eyepiece 8 which is identical to the gunsight eyepiece 4. Thus, the operator is provided with the same eye relief and field of view when viewing this combined image as the normal gunsight eyepiece provides. The combined image is effectively the image seen by the optical gunsight 3 in its undistorted condition with a second image superimposed thereon from the CRT 14. The five-element eyepiece is dioptrically adjustable, as is the gunner's eyepiece, to permit accommodation of the gunsight to individual gunners in a way which does not detract from actual firing conditions.

The optical path folds provided by the device are an even number so as to prevent inversion or reversion of the viewed image. This result is accomplished without resorting to the use of a complex prism or other optical elements.

The additional viewport includes a lens assembly 41, permitting a camera 40 to be coupled to the device for recording the images produced by the gunsight and projector 14 during use.

The camera 40 has an optical path 34 folded by mirror 29 and 30 to be coincident with the optical axis of beam splitter 26. The camera 40 will permit viewing the combined image of projector CRT 14 and the internal scene image produced by the gunsight. For ease of illustration, FIG. 3 shows mirror 37 and CRT 14 to be displaced downward from their actual location, which is parallel to mirror 30, lens 41 and camera 40. Consistent with FIGS. 1 and 2, these mirrors are rotated 90° in the direction of the viewed scenery.

The lens prescriptions for the elements shown in FIG. 3 are given in the Table below. In the first column, this Table provides an identification of the surface of the optical element identified in the adjacent row. The surface numbers 1–52 correspond to a surface count for the device as the image ray is traced from the gunner's eyepiece 4 through the various optical folds to the eyepiece 8. Surfaces 53–56 identify optical surfaces in the path from CRT 14 to beam combiner 26. Surfaces 57–78 identify the optical surfaces in the path from beam combiner 26 to camera 40. Each element of the Erfle lens assembly 24 and relay lens assembly 28 is specified, as well as each half of the pair of prisms 11 and those comprising beam splitter/combiner 26.

OPTICAL LAYOUT

| Surface | Radius | Thickness | CLR Aperture | Material | |
|---|---|---|---|---|---|
| 1 | ∞ | .600 | 1.200 | 691547 | |
| 2 | ∞ | .600 | 1.200 | | PRISM 11 |
| 3 | ∞ | .9125 | 1.200 | Air | (½) |
| 4 | 16.691 | .100 | 1.000 | 805254 | |
| 5 | 1.725 | | 2.000 | | ERFLE LENS |
| 6 | 1.725 | .400 | 1.200 | 691547 | ASSEMBLY |
| 7 | −4.177 | .012 | 1.200 | Air | 24 |
| 8 | 2.147 | .380 | 1.370 | 691547 | |
| 9 | −2.147 | .010 | 1.370 | Air | |
| 10 | 1.028 | .400 | 1.320 | 691547 | |
| 11 | −4.177 | | 1.240 | | |
| 12 | −4.177 | .100 | 1.240 | 805254 | |
| 13 | .974 | .5248 | 1.050 | Air | |
| 14 | ∞ | .130 | 1.100 | 607567 | FIELD FLAT 46 |
| 15 | −3.487 | 1.250 | 1.100 | Air | |
| 16 | ∞ | .600 | 1.070 | 691547 | MIRROR 25 |
| 17 | ∞ | .600 | 1.070 | 691547 | BEAM |
| 18 | ∞ | 1.250 | 1.070 | Air | COMBINER |
| 19 | ∞ | .600 | 1.070 | 691547 | 26 (½) |
| 20 | 8.996 | .250 | 1.270 | 691547 | RELAY |
| 21 | −4.177 | .025 | 1.260 | Air | |
| 22 | 2.381 | .200 | 1.200 | 691547 | LENS |
| 23 | 8.996 | .027 | 1.200 | Air | |
| 24 | 1.054 | .370 | 1.090 | 691547 | ASSEMBLY |
| 25 | −16.691 | .030 | 0.920 | Air | |
| 26 | −11.256 | .100 | 0.870 | 603380 | 28 |
| 27 | 0.711 | .2935 | 0.700 | Air | |
| 28 | −1.725 | .125 | 0.580 | 785261 | |
| 29 | 1.725 | .2935 | 0.580 | Air | |
| 30 | −0.711 | .100 | 0.700 | 603380 | |
| 31 | 11.256 | .030 | 0.870 | Air | |
| 32 | 16.691 | .370 | 0.920 | 691547 | |
| 33 | −1.054 | .027 | 1.090 | Air | |
| 34 | −8.996 | .200 | 1.200 | 691547 | |
| 35 | −2.381 | .025 | 1.200 | Air | |
| 36 | 4.177 | .250 | 1.260 | 691547 | |
| 37 | −8.996 | 1.500 | 1.270 | Air | |
| 38 | ∞ | 1.000 | 1.400 | Air | MIRROR 32 |
| 39 | ∞ | 1.000 | 1.400 | Air | MIRROR 33 |
| 40 | ∞ | .600 | 1.200 | 691547 | |
| 41 | ∞ | .600 | 1.200 | 691547 | PRISM 11 (½) |
| 42 | ∞ | .764 | 1.200 | Air | |
| 43 | −.974 | .100 | 1.050 | 318894 | |
| 44 | 4.177 | | 1.240 | | EYEPIECE |
| 45 | 4.177 | .400 | 1.240 | 691547 | 8 |
| 46 | −1.028 | .010 | 1.320 | Air | |
| 47 | 2.147 | .380 | 1.370 | 691547 | |
| 48 | −2.147 | .012 | 1.370 | Air | |
| 49 | 4.177 | .400 | 1.200 | 691547 | |
| 50 | −1.725 | .100 | 1.000 | | |
| 51 | 1.725 | .100 | 1.200 | 805254 | |
| 52 | −16.691 | .91186 | 1.000 | Air | |
| 53 | ∞ | .558 | 1.034 | Air | MIRROR 37 |
| 54 | ∞ | .600 | 1.063 | 691003 | |
| 55 | ∞ | .600 | | | BEAM COMBINER |
| 56 | ∞ | 2.077 | 1.220 | Air | 26 (½) |
| 57 | ∞ | 2.077 | 1.337 | Air | MIRROR 30 |
| 58 | ∞ | 2.077 | 1.454 | Air | MIRROR 29 |
| 59 | 2.9295 | .250 | 1.570 | 651150 | |
| 60 | 2.5977 | | 1.570 | | |
| 61 | −2.5977 | .400 | 1.581 | 617274 | CAMERA |
| 62 | 33.393 | .080 | 1.62 | Air | LENS 41 |
| 63 | 2.4104 | .500 | 1.65 | 518274 | |
| 64 | −2.09256 | | | | |
| 65 | 2.09256 | .250 | 1.625 | 651150 | |
| 66 | 7.83987 | 1.000 | 1.61 | Air | |
| 67 | 3.0866 | .200 | 1.66 | 661150 | |
| 68 | 5.045235 | | | | |
| 69 | −5.045235 | .300 | 1.63 | 518274 | |
| 70 | −2.9816 | .550 | 1.606 | Air | |
| 71 | −1.47683 | .250 | 1.299 | 791341 | |
| 72 | −10.000 | .700 | 1.350 | Air | |
| 73 | 1.165798 | .600 | 1.479 | 693309 | |
| 74 | −2.019288 | | | | |
| 75 | 2.019288 | .200 | 1.358 | 810881 | |
| 76 | −15.310 | .574 | 1.217 | Air | |
| 77 | −.9959 | .200 | .7034 | 693309 | |
| 78 | ∞ | .225 | .66 | Air | |

Thus, there has been described a compact viewing device for permitting superposition of additional images on a gunner's optical sight, as well as permitting additional viewing by a camera recording the image scene. The device retains all the characteristics of the non-equipped optical sight providing realistic training opportunities, while monitoring the effect of the gunner's action during sighting of the weapon. Those skilled in the art will recognize yet other embodiments of the invention as described more particularly by the claims which follow.

What is claimed is:

1. An external gunsight viewing apparatus comprising:
   a housing having first, second and third optical ports for receiving and transmitting images, said first and second optical ports being located opposite to each other along a common axis;
   a coupling member for coupling said first port to said gunsight, aligning said gunsight optical axis with said common axis;
   a prism disposed along said common axis, having a reflective surface, for folding the optical path of an image entering said first port along an orthogonal axis;
   Erfle lens means having an axis lying along said orthogonal axis within said housing, providing an image which is viewed through said third optical port;
   means including a lens disposed in said third optical port permitting viewing of said first image;
   a beam combining means located along a viewing axis of said third port for combining said image with an image entering a fourth port of said housing;
   a relay means for relaying said combined image; and,
   mirror means for directing said relayed combined image to said prism, said prism folding said combined image optical path along said common axis to said second port.

2. The viewing apparatus of claim 1 further comprising a mirror positioned within said housing to face said fourth port and said beam combining means, whereby an image entering said fourth port is directed to said beam combiner.

3. The viewing apparatus of claim 1 wherein said Erfle lens means and said relay means have optical axes parallel to each other, and perpendicular to said common axis to maintain the dimensions of said housing along said common axis at a minimum.

4. An external gunsight viewing apparatus for direct coupling to a gunsight comprising:
   a casing having multiple optical ports, the first of which includes a coupling member for coupling said casing to said gunsight;
   an optical system within said casing coupling a gunsight produced image from said first port to a second port having a common optical axis with said first port, and to a third port having a displaced optical axis for permitting viewing of said gunsight image comprising:
   a prism located along said common axis having a surface for directing said image along an axis orthogonal to said common axis;
   Erfle lens means for producing an internal image along said orthogonal axis;
   a mirror positioned between a third port in said housing and said Erfle lens to permit viewing of said internal image along the axis of said third port;
   a beam combiner located along said third port axis;
   a second mirror positioned between a fourth port and said beam combiner for creating an optical path between said fourth port and said beam combiner; and,
   a relay lens means directing a combined image from said beam combiner to third and fourth mirrors, said third and fourth mirrors providing an optical path for said combined image to said prism surface, whereby said prism directs said combined image to said second port.

5. The viewing apparatus of claim 4 further comprising an eyepiece lens located between said second port and said prism surface.

6. The viewing apparatus of claim 5 further comprising a viewing lens located between said third port and said mirror.

7. The apparatus of claim 4 further comprising a camera means coupled to said third port for viewing images produced by said gunsight.

8. A narrow profile viewing apparatus for direct coupling to a gunsight comprising:
   a casing having along a first narrow dimension first and second aligned optical ports, said first port including coupling means for coupling said casing to said gunsight and a third port having an axis displaced from a common axis of said first and second optical ports;
   a reflecting prism having a reflecting surface, said surface having a first side reflecting an image from said gunsight along a first axis orthogonal to said axis of said first and second optical ports;
   Erfle lens means located along said orthogonal axis for producing an internal image;
   mirror means for folding the axis of said internal image about a second optical axis orthogonal to said common axis and said first orthogonal axis to said third port;
   beam splitting means along said second optical axis for directing said internal image along a third optical axis parallel to said first orthogonal optical axis, as well as permitting viewing of said internal image through said third port;
   relay means for relaying said image along said third optical axis;
   second mirror means for folding said third optical axis along a fourth orthogonal axis parallel to said second optical axis; and,
   third mirror means for folding said internal image about a fifth axis orthogonal to said fourth axis to a second side of said prism reflecting surface, whereby said prism folds said internal image a sixth time along said common axis, permitting viewing of said internal image through said second optical port.

9. The apparatus of claim 8 further comprising an eyepiece located in said second port having diopter control.

10. The apparatus of claim 8 further comprising a fourth optical port, said fourth optical port facing a fourth mirror means which folds an image port from said optical fourth port along said third orthogonal axis to said beam splitting means.

* * * * *